Jan. 30, 1951  C. A. ABLETT  2,539,682
ROLLER THRUST BEARING

Filed Nov. 5, 1946  2 Sheets-Sheet 1

INVENTOR
Charles Antony Ablett
BY Cameron, Kerkam, & Sutton
ATTORNEYS

Jan. 30, 1951     C. A. ABLETT     2,539,682
ROLLER THRUST BEARING
Filed Nov. 5, 1946     2 Sheets-Sheet 2
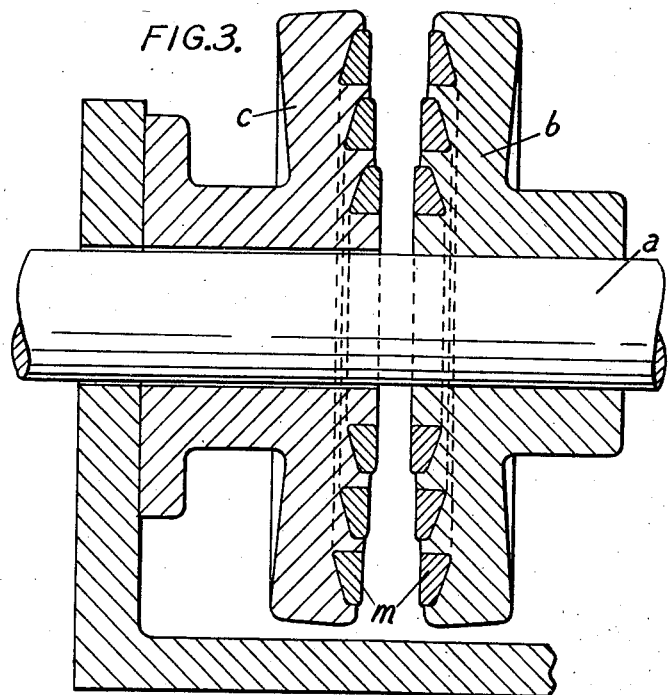
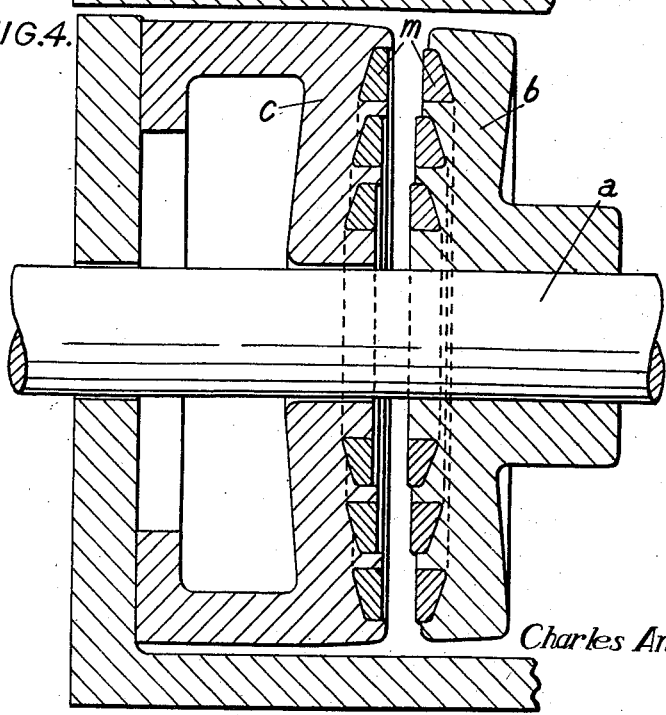
INVENTOR
Charles Antony Ablett
BY Cameron, Kerkam & Sutton
ATTORNEYS Patented Jan. 30, 1951

2,539,682

UNITED STATES PATENT OFFICE 2,539,682

ROLLER THRUST BEARING

Charles Antony Ablett, Norfolk, England

Application November 5, 1946, Serial No. 707,912
In Great Britain July 5, 1944

Section 1, Public Law 690, August 8, 1946
Patent expires July 5, 1964

4 Claims. (Cl. 308—234)

This invention relates to roller thrust bearings and more particularly to roller thrust bearings in which the roller bearing cage comprises a ring-like part or two or more separate concentric ring-like parts which or each of which carries a plurality of radially disposed roller bearing elements.

The chief object of the present invention is to provide an improved form of roller thrust bearing which may, with advantage, be adapted or adopted for use as a thrust bearing block, for example, as a thrust bearing block for propeller shafts such as are employed in marine propulsion.

According to the present invention there is provided a roller bearing thrust block wherein between a thrust imparting surface carried by a rotatable shaft or equivalent member and the surface of a flange or abutment which is adapted to take the thrust there is interposed a roller bearing cage comprising a ring-like part or a plurality of separate concentric ring-like parts having or each having mounted thereon or therein a plurality of radially disposed roller bearing elements, and supporting means for the cage comprising a series of rollers arranged with their axes parallel with the axis of the shaft and disposed so as to locate the cage members in concentric relation to the said shaft.

In some instances, this arrangement may be duplicated, triplicated or otherwise multiplied by providing a number of spaced flanges or abutments on the rotary shaft and a number of fixed flanges or abutments and by interposing a roller bearing cage member having the characteristics described between each pair of adjacent flanges or abutments.

Also for some purposes, the said roller bearing cage member may be subdivided or made up of a plurality of separate, concentric, annular or ring-like parts each having mounted therein one or more sets of the aforesaid radially disposed roller bearing elements, and such elements or selected ones of such elements may each comprise a series of separate relatively short thrust rollers.

The plurality of relatively short thrust rollers which constitute each roller bearing element may be axially aligned, and in this case, in some instances, the cage member may, in addition be provided with other radially disposed, thrust-taking rollers, disposed near the outer peripheral surface of the cage member and between the radii on which the axially aligned, thrust rollers are located.

In accordance with another feature of the present invention, provision is made for enabling the thrust bearing to accommodate itself to any deflection of the thrust-imparting and/or the thrust-taking surfaces that may occur under load conditions. Thus, it will be appreciated that under load conditions, there may be a tendency for the opposed flat surfaces or flanges of the movable and fixed abutments to flex or move away from each other or otherwise to become displaced or distorted out of a true radial plane with the result that the gap between such surfaces or flanges may become displaced laterally or become divergent towards the outer peripheral surface of the cage member. In this connection, it will also be appreciated that distortion of the fixed abutment will depend upon the manner in which it is supported. If it is supported by a tubular structure near the shaft, it will probably distort so that the gap will become divergent as already stated. If, however, it is supported by a tubular structure holding the same near its outer periphery, the distortion of the fixed abutment will probably follow the distortion of the movable abutment with the result that the said gap, instead of becoming divergent, may become displaced laterally or caused to assume a curved form. Under such circumstances, the transverse width of the gap may remain constant or may increase slightly or may decrease slightly. Accordingly, and in order to take care of this factor, the relatively short rollers and/or the surfaces on the abutments with which they engage may be so arranged and formed as to enable the load to be distributed evenly and not unduly to load any one part of the thrust bearing. This may be accomplished in a number of ways. For example, according to one arrangement, the relatively short thrust-taking rollers are formed so that those farthest from the shaft are slightly greater in diameter than those nearest to the shaft and so that the intermediate rollers progressively (radially outward from the shaft) increase in diameter to such an extent as will cause or enable the rollers and the thrust surfaces to engage with each other to secure an even distribution of the load under load conditions. According to another arrangement, the annular portions of the thrust surfaces which are engaged by the relatively short thrust-taking rollers may be stepped back from one another or staggered radially outward from the axis of the shaft with similar effect, it being appreciated that in either arrangement the staggering or the diameter variation should be such as will conform with the curve of deflection produced or expected in the thrust surfaces under load conditions and will enable a proper distribution of the load to be effected. If desired, the aforesaid annular portions may be formed as ring-like elements or races which are separate from the thrust imparting or thrust taking members and are seated in annular grooves formed therein, the bottoms of the grooves and the bottoms of the elements or races being curved or otherwise mutually formed to permit flexure and the maintenance of bearing surfaces in full contact with the surfaces of the rollers.

It is to be understood that the cage member or the annular or ring-like parts constituting the same and the races are perferably split or made in two or more segmental sections and suitable means are provided for retaining or maintaining the individual thrust rollers in their correct positions.

In order that the said invention may be clearly understood and readily carried into effect, the same will now be more fully described with reference to the accompanying drawings in which:

Fig. 3 is a diagrammatic view illustrating to an exaggerated degree one manner in which distortion may take place; and Fig. 4 is another diagrammatic view illlustrating also to an exaggerated degree another manner in which distortion may take place.

Figure 1:
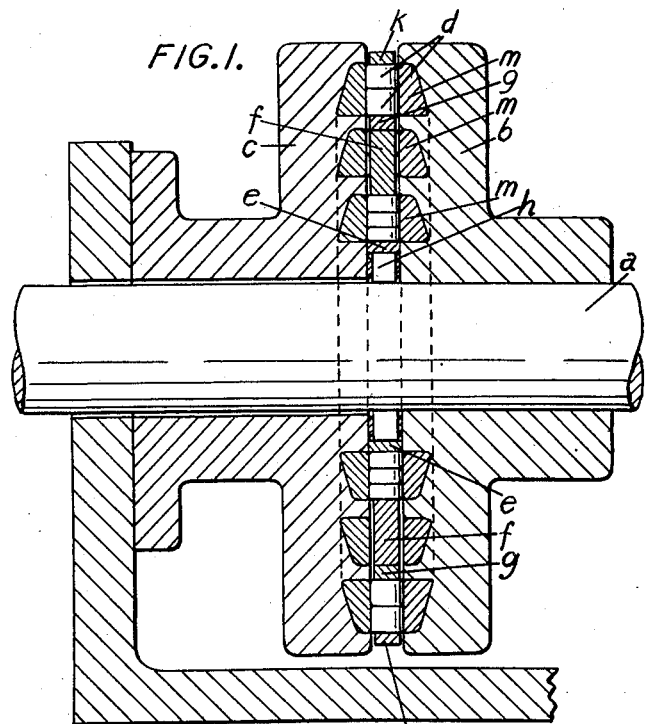
Fig. 1 shows diagrammatically and in section one mode of carrying the invention into effect.
Figure 2:
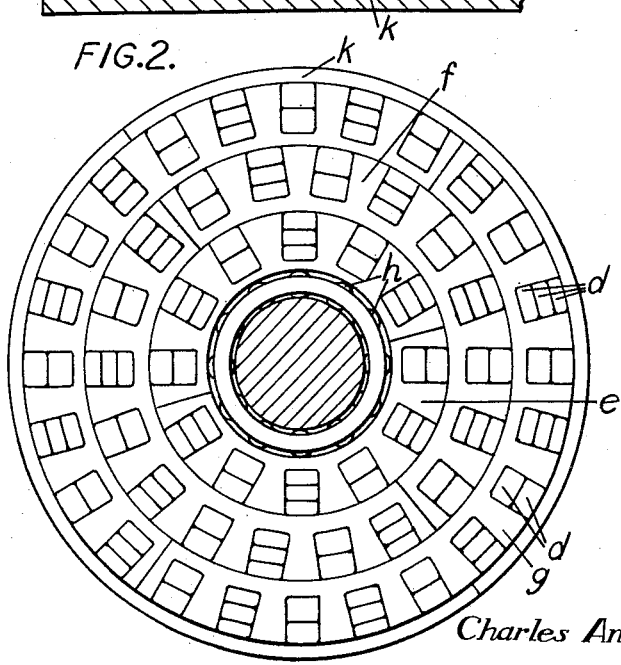
Fig. 2 is a detail view of one form of split cage or series of concentric cages that may be employed to carry the short thrust rollers.

In the accompanying drawings, the rotary shaft is indicated at $a$ and $b$ indicates a flange member which is suitably secured to the shaft to form the rotary abutment of a thrust bearing. The fixed abutment is constituted by another flange member $c$ and between the two abutments there is arranged a cage carrying a plurality of separate, spaced, relatively short, thrust rollers $d$. In the preferred form of the invention, the aforesaid cage is made up of a plurality of separate, concentric, annular or ring-like parts each having mounted therein one or more sets of radially-disposed, short, thrust rollers. For example, there may be provided three split or divided annular or ring-like parts such as are shown at $e$, $f$ and $g$, the arrangement being such that a roller bearing having a series of rollers $h$ with their axes arranged parallel with the shaft is disposed between the shaft and the inner annular or ring-like part $e$ in order to support the weight of the cage and so that the cage cannot rub on the shaft. Each annular or ring-like part is provided with a set of radially disposed, short, thrust rollers and along each radial line there may be one or two or more rollers, journalled in suitable radial slots or openings provided for the purpose. The rollers may be parallel or tapered and around the outer annular or ring-like part $g$, there is arranged suitable means such as a split locking ring $k$ for preventing the cage elements from separating or flying apart under the influence of the centrifugal forces developed, said means or locking ring being suitably secured to the outermost cage element or annular ring.

The rotary and fixed abutments or flanges are preferably each provided with a plurality of removable or replaceable thrust rings or races such as are shown at $m$, there being a separate race $m$ for each set of thrust rollers $d$. Such races may be let into annular grooves formed in the fixed and rotary abutments and, if desired, the races and the grooves may be mutually formed to permit slight flexure as already stated.

In some instances, all of the relatively short thrust rollers may be of the same diameter and the thrust surfaces with which they engage may be disposed in truly radial planes so that the gap between such surfaces is of constant width. In other instances, the relatively short thrust rollers may be formed so that those farthest from the shaft are slightly greater in diameter than those nearest to the shaft and so that the intermediate rollers are of an intermediate diameter or progressively (radially outward from the shaft) increase in diameter to such an extent as will cause or enable the rollers and the thrust surfaces to engage with each other to secure an even distribution of the load under load conditions or to accommodate a distortion effect such as is illustrated to an exaggerated degree in Fig. 3 in which the gap between the abutment surfaces becomes divergent or more divergent under the influence of the load.

As already explained the manner in which the thrust surfaces will distort or tend to distort will depend very largely upon the manner in which the fixed abutment is supported. If it is supported in a manner such as is illustrated diagrammatically in Fig. 3, the gap between the surfaces in question will tend to widen at its outer periphery or to become divergent or more divergent and, under such circumstances, it is usually preferable to employ thrust rollers which at the outer part of the cage are slightly greater in diameter than those which are situated near to the shaft. On the other hand, if the fixed abutment is supported in a manner such as is illustrated diagrammatically in Fig. 4, the gap between the surfaces in question may tend to become displaced laterally to assume a curved form and, under such circumstances, parallel-walled rollers all of the same diameter may be used.

I claim:

1. A roller thrust bearing comprising in combination opposed flat-surfaced race members, means for imparting thrust to and receiving thrust from said race members, a plurality of concentric series of radially disposed cylindrical thrust rollers between said race members, a plurality of cage members, one for each series of rollers, said cage members fitting within one another and being movable circumferentially relatively to one another, said cage members comprising ring-like elements having radial notches extending partially across said elements from their outer peripheries to receive said rollers and continuous inner margins having flat peripheral surfaces surrounding the next inner cage members, and means for maintaining said cage members concentric with said race members comprising a further series of cylindrical rollers having their axes disposed substantially parallel to the axis of the bearing and a cage which is separate from and rotatable independently of said cage members, the inner peripheral surface of the innermost cage member bearing on said further series of rollers.

2. A roller thrust bearing as defined in claim 1 wherein each cage member is subdivided into a plurality of circumferential segments and the outer cage member is provided with means uniting its segments together.

3. A roller thrust bearing as defined in claim 1, said race members being subdivided into a plurality of circumferential segments, and thrust-imparting and thrust-receiving members each having means to seat said segments thereon.

4. A roller thrust bearing as defined in claim 3, said thrust-imparting and thrust-receiving members each comprising a central supporting portion and a flange extending radially outward from said central portion, said flanges being arranged to face one another and carrying said race members.

CHARLES ANTONY ABLETT.

REFERENCES CITED

The following references are of record in the file of this patent:

UNITED STATES PATENTS

| Number | Name | Date |
|---|---|---|
| 431,690 | Gaffield | July 8, 1890 |
| 449,952 | Simonds | Apr. 7, 1891 |
| 673,220 | Perkins | Apr. 30, 1901 |
| 856,291 | Perkins | June 11, 1907 |
| 1,380,622 | Winn | June 7, 1921 |
| 1,684,012 | Dennison | Sept. 11, 1928 |
| 2,117,633 | Smith | May 17, 1938 |
| 2,374,820 | Kaye | May 1, 1945 |

FOREIGN PATENTS

| Number | Country | Date |
|---|---|---|
| 509,004 | Great Britain | July 10, 1939 |